(12) United States Patent
Marche

(10) Patent No.: US 10,081,433 B2
(45) Date of Patent: Sep. 25, 2018

(54) FRONT ENGINE ATTACHMENT FOR AN AIRCRAFT ENGINE

(71) Applicant: Airbus Operations S.A.S., Toulouse (FR)

(72) Inventor: Jacques Hervé Marche, Toulouse (FR)

(73) Assignee: Airbus Operations S.A.S. (FR)

( * ) Notice: Subject to any disclaimer, the term of this patent is extended or adjusted under 35 U.S.C. 154(b) by 257 days.

(21) Appl. No.: 14/926,908

(22) Filed: Oct. 29, 2015

(65) Prior Publication Data
US 2016/0122030 A1    May 5, 2016

(30) Foreign Application Priority Data
Nov. 3, 2014 (FR) ...................... 14 60550

(51) Int. Cl.
*B64D 27/00* (2006.01)
*B64D 27/26* (2006.01)

(52) U.S. Cl.
CPC ........ *B64D 27/26* (2013.01); *B64D 2027/262* (2013.01); *B64D 2027/264* (2013.01); *B64D 2027/266* (2013.01)

(58) Field of Classification Search
CPC ......... B64D 27/26; B64D 2027/262–2027/266
USPC ..................... 244/51, 53 R, 54, 55
See application file for complete search history.

(56) References Cited

U.S. PATENT DOCUMENTS

| | | | | |
|---|---|---|---|---|
| 5,277,382 A * | 1/1994 | Seelen | ................... | B64D 27/26 244/54 |
| 5,871,177 A | 2/1999 | Demouzon et al. | | |
| 6,341,746 B1 * | 1/2002 | Pascal | ................... | B64D 27/26 244/54 |
| 6,601,796 B2 * | 8/2003 | Roszak | ................... | B64D 27/26 244/54 |
| 7,770,840 B2 * | 8/2010 | Diochon | ................... | B64D 27/26 244/53 R |
| 8,083,176 B2 * | 12/2011 | Lafont | ................... | B64D 27/26 244/54 |

(Continued)

FOREIGN PATENT DOCUMENTS

EP    0844174 A1    5/1998
EP    1712466 A1    10/2006
(Continued)

OTHER PUBLICATIONS

French Search Report for Application No. 1460550 dated Jun. 22, 2015.

Primary Examiner — Marc Burgess
(74) Attorney, Agent, or Firm — Lerner, David, Littenberg, Krumholz & Mentlik, LLP

(57) ABSTRACT

A front engine attachment, intended to fix an engine to a structure of an aircraft, includes a first attachment including a base intended to be fixed to the structure, a first fixture articulated on the base, two first connecting rods, each being articulated by a first end to the engine and by a second end to the fixture, and a first cylindrical nose mounted on the base. The front engine attachment includes a second attachment including a cradle including an orifice into which the cylindrical nose is fitted, and a second cylindrical nose being threaded into a piercing of the engine, and two second connecting rods, each being intended to be articulated by a first end to the engine, and by a second end to the cradle.

6 Claims, 3 Drawing Sheets

(56) References Cited

U.S. PATENT DOCUMENTS

| | | | |
|---|---|---|---|
| 8,167,237 B2* | 5/2012 | Suciu | B64D 27/26 |
| | | | 244/54 |
| 8,336,812 B2 | 12/2012 | Beaufort et al. | |
| 8,366,038 B2 | 2/2013 | Marche | |
| 8,800,916 B2 | 8/2014 | Marche | |
| 8,950,702 B2* | 2/2015 | Cloft | B64D 27/26 |
| | | | 244/54 |
| 8,985,509 B2* | 3/2015 | Sandy | B64D 27/26 |
| | | | 244/54 |
| 2014/0061371 A1* | 3/2014 | Good | B64C 3/56 |
| | | | 244/49 |
| 2014/0084129 A1* | 3/2014 | Sandy | B64D 27/26 |
| | | | 248/554 |

FOREIGN PATENT DOCUMENTS

| | | |
|---|---|---|
| EP | 2522575 A2 | 11/2012 |
| FR | 2892706 A1 | 5/2007 |
| WO | 2006097484 A1 | 9/2006 |

\* cited by examiner

FRONT ENGINE ATTACHMENT FOR AN AIRCRAFT ENGINE

FIELD OF THE INVENTION

The present invention relates to a front engine attachment for an aircraft engine comprising a first attachment and a second attachment, and an aircraft comprising at least one such front engine attachment.

BACKGROUND

Usually, a strut of an aircraft is provided to form the link interface between an engine, such as a jet engine, and a structure part, generally the wing, of the aircraft.

The strut is notably provided with an attachment system interposed between the engine and a rigid structure of the strut. This attachment system comprises a front engine attachment and a rear engine attachment, the arrangement and the design of which are determined and certified to effectively take up the loads and moments likely to be generated on the three axes of the aircraft.

A front engine attachment of the prior art comprises, among other things, a fixture designed to be fixed to the casing of the compressor of the engine via two connecting rods. For its part, the fixture is fixed to the structure of the aircraft.

The aircraft engines, and particularly those of double flux type with high dilution rate (greater than 13:1), have a high weight which generates significant loads in the front engine attachment.

BRIEF SUMMARY OF THE INVENTION

An aspect of the present invention proposes a front engine attachment for an aircraft engine which does not present the drawbacks of the prior art and which in particular allows for a better distribution of the loads in the front engine attachment.

To this end, there is proposed a front engine attachment for an aircraft engine, intended to fix an engine to a structure of the aircraft, the front engine attachment comprising a first attachment comprising:
a base intended to be fixed to the structure,
a first fixture mounted articulated on the base,
two first connecting rods, each being intended to be articulated, on the one hand, by a first end, to the engine, and, on the other hand, by a second end to the fixture, and
a first cylindrical nose mounted on the base.

Said front engine attachment further comprises a second attachment comprising:
a cradle comprising:
an orifice into which the cylindrical nose is fitted, and
a second cylindrical nose intended to be threaded into a piercing of the engine, and
two second connecting rods each being intended to be articulated, on the one hand, by a first end, to the engine, and, on the other hand, by a second end to the cradle.

Such a front engine attachment makes it possible to distribute the forces over a greater number of articulations.

Advantageously, the first cylindrical nose is fixed in the orifice via a ball coupling.

Advantageously, the second connecting rods are arranged in a plane at right angles to a longitudinal axis of the engine.

Advantageously, one of the second connecting rods of the second attachment is rotationally blocked on the side of the cradle.

The invention also proposes an aircraft comprising a structure, an engine and a front engine attachment according to one of the preceding variants, the base of which is fixed to the structure by the fixing means and the engine of which is fixed to the connecting rods.

Advantageously, the second connecting rods of the second attachment are arranged in a plane at right angles to a longitudinal axis of the engine.

Advantageously, the engine comprises a front bearing and a central bearing, the articulations of the first connecting rods on the engine are arranged in a plane passing centric between the plane at right angles to the longitudinal axis of the engine and passing through the second cylindrical nose and the plane containing the second connecting rods, and the articulations of the second connecting rods on the engine are arranged in a plane passing through the central bearing.

Advantageously, the fixing means take the form of a double piano hinge consisting of two subassemblies, each comprising first ribs deriving from the base and second ribs deriving from the structure, the first and second ribs are fitted into one another and they are kept secured together by axes passing through them.

BRIEF DESCRIPTION OF THE DRAWINGS

The features of the invention mentioned above, and others, will become more clearly apparent on reading the following description of an exemplary embodiment, said description being provided in relation to the attached drawings, in which.

DETAILED DESCRIPTION

Figure 1:
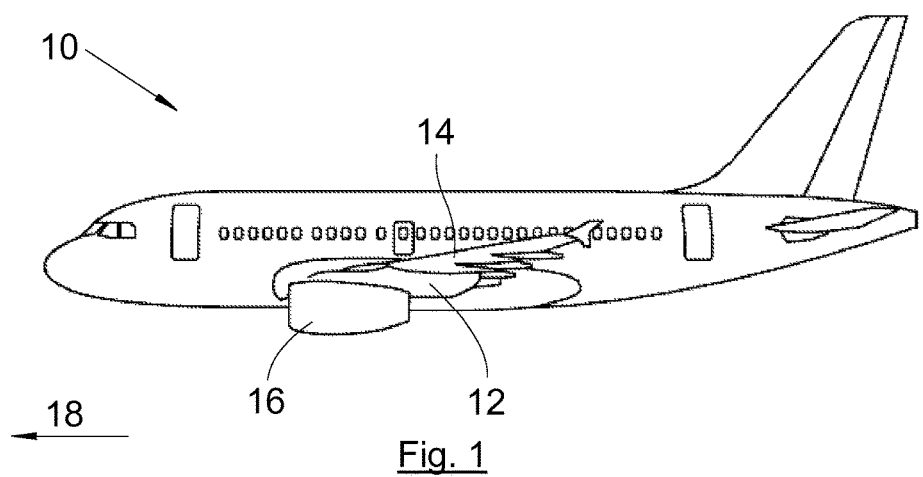
FIG. 1 is a side view of an aircraft according to an embodiment of the invention.

FIG. 1 shows an aircraft 10 which comprises a strut 12 fixed under the structure of a wing 14 of the aircraft 10. The aircraft 10 also has an engine nacelle 16 fixed to the strut 12 and inside which is arranged an engine (20, FIG. 2).

Figure 2:
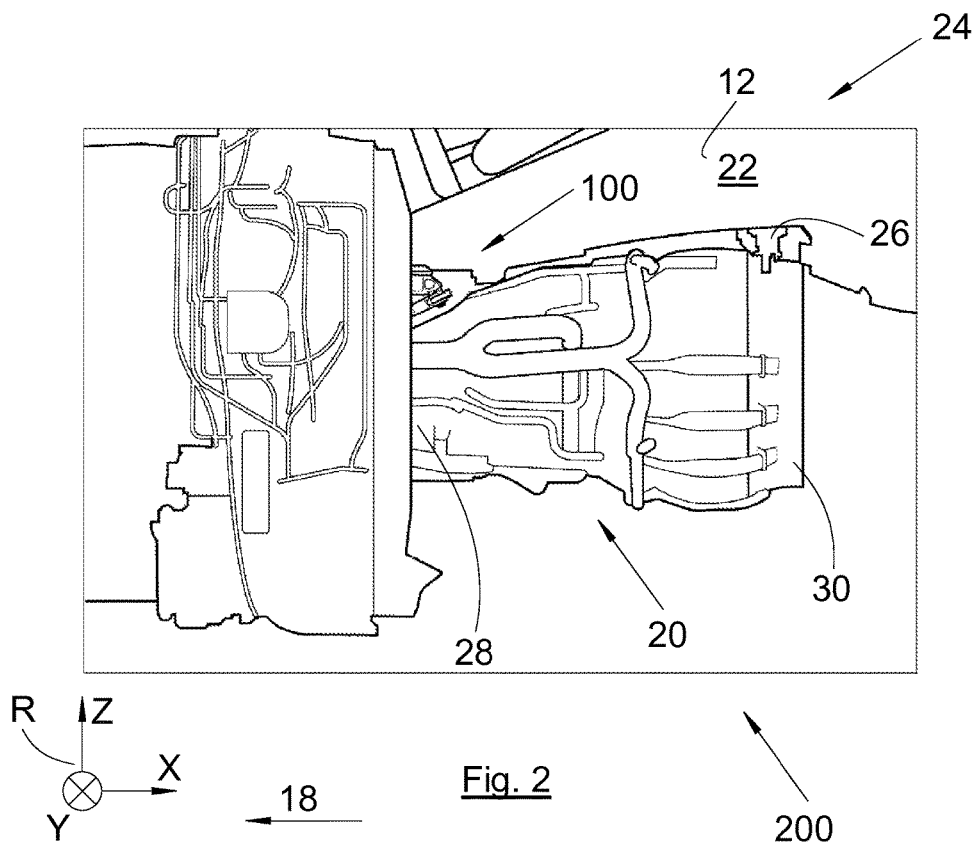
FIG. 2 is a lateral schematic view of an engine assembly.

FIG. 2 shows an engine assembly 200 which comprises the engine 20, the strut 12 to the structure 22 of which the engine 20 is fixed, and an attachment system 24 which comprises a front engine attachment 100 and a rear engine attachment 26 which fix the engine 20 to the structure 22.

In the example presented here, the engine 20 has a casing of the compressor 28 and a central casing 30. Hereinafter in the description, different elements are fixed to the casing of the compressor 28 or to the central casing 30, but in a more general embodiment, these elements are fixed to the engine 20.

The engine assembly 200 is assigned an orthonormal reference frame R having axes or directions X, Y and Z. It is considered that:
the direction X is a longitudinal direction, this direction X running level with the front engine attachment 100 and being parallel to a longitudinal axis of the engine 20 and substantially parallel to a median longitudinal direction of the strut 12, the direction Y is a transverse direction, oriented transversely relative to the strut 12, the direction Y being orthogonal to the direction X, and the direction Z is a vertical direction, which is orthogonal to the directions X and Y.

Furthermore, throughout the description, the terms "front" and "rear" are to be considered in relation to a direction of advance of the aircraft 10 encountered when a thrust is exerted by the engine 20, this direction being represented schematically by an arrow 18 in FIGS. 1 and 2.

The rear engine attachment 26 is of the usual type and is known to those skilled in the art and is not described further.

Figure 3:
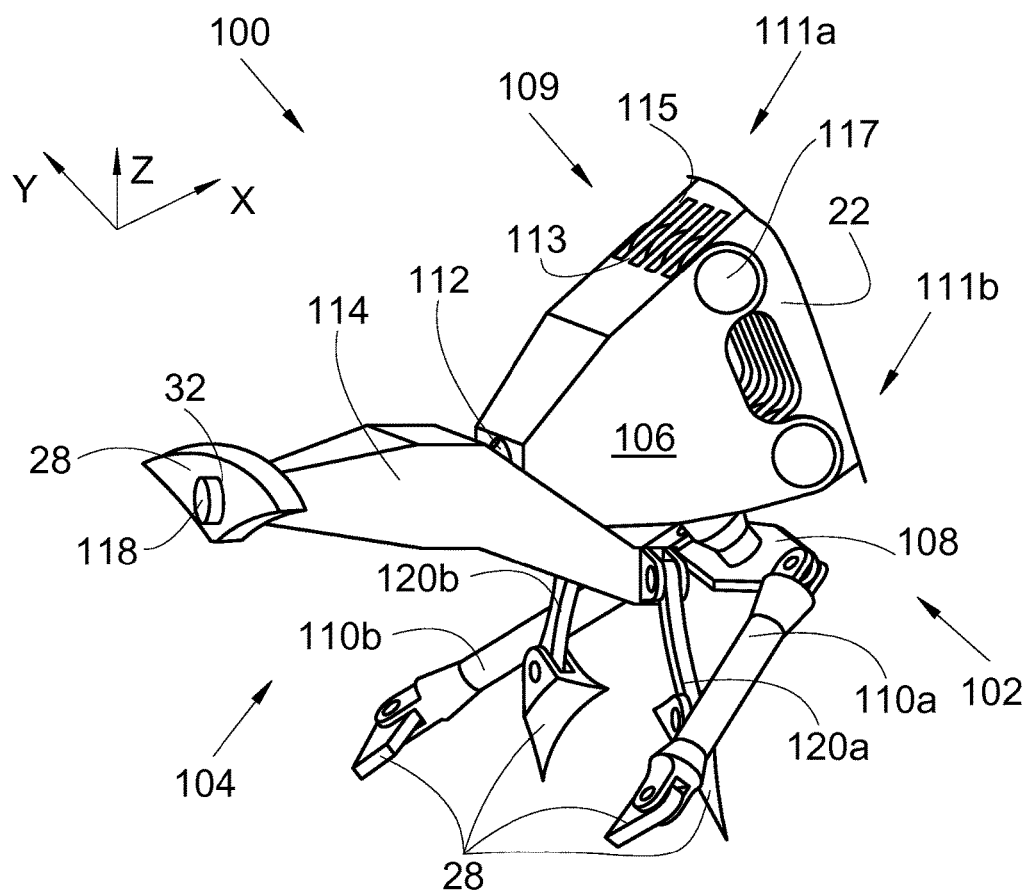
FIG. 3 is a perspective view of a front engine attachment according to an embodiment of the invention and comprising a first attachment and a second attachment.

The front engine attachment 100 comprises, as represented in FIG. 3, a first attachment 102 and a second attachment 104.

Figure 5:
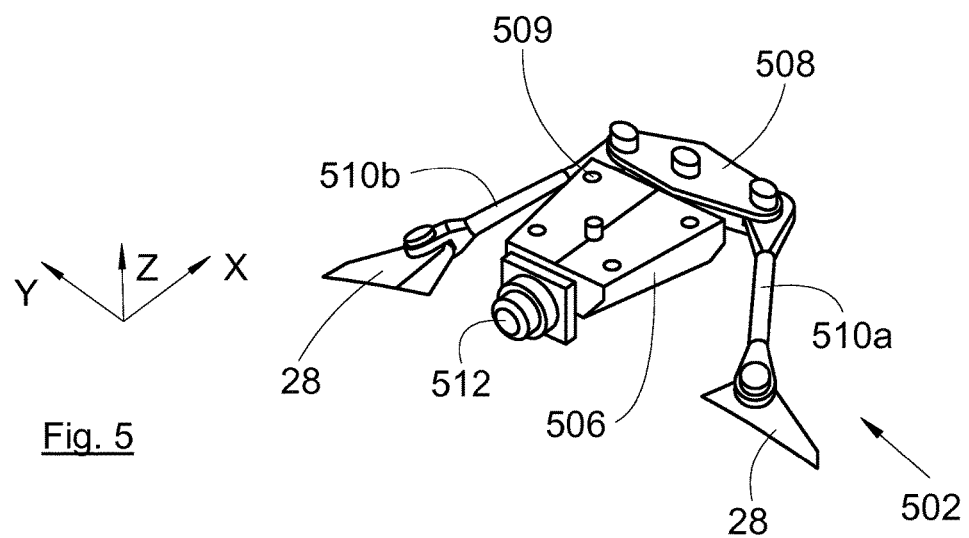
FIG. 5 is a perspective view of a first attachment that can be implemented in the front engine attachment according to an embodiment of the invention.

FIG. 5 shows a first attachment 502 according to another embodiment.

The first attachment 102, 502 comprises:
a base 106, 506 intended to be fixed to the structure 22,
a first fixture 108, 508 mounted articulated on the base 106, 506, in particular rotationally mobile about an axis of rotation contained in a vertical plane XZ,
two first connecting rods 110a-b, 510a-b arranged here symmetrically relative to a vertical place XZ, each being articulated, on the one hand, by a first end, to a part of the casing of the compressor 28, and, on the other hand, by a second end to the fixture 108, 508, and
a first cylindrical nose 112, 512 mounted on the base 106, 506 and oriented horizontally forward.

Figure 4:
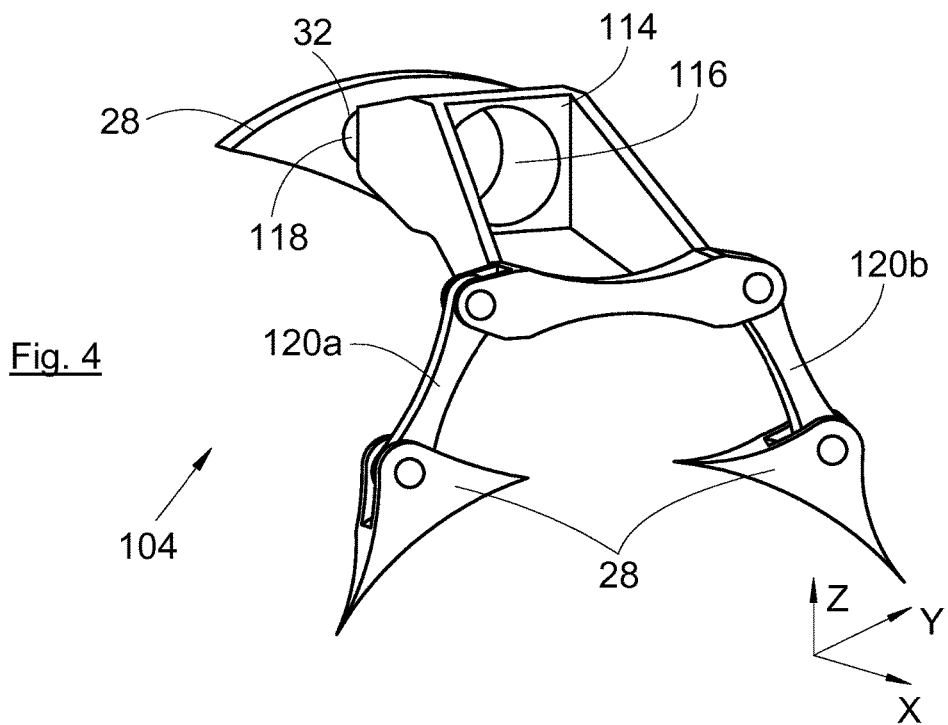
FIG. 4 is a perspective view of the second attachment of FIG. 1.

The second attachment 104 which is represented by another view in FIG. 4 comprises:
a cradle 114 comprising:
an orifice 116 into which the cylindrical nose 112, 512 is fitted, and
a second cylindrical nose 118 intended to be threaded into a piercing 32 of the casing of the compressor 28 and oriented horizontally forward, and
two second connecting rods 120a-b, arranged here symmetrically relative to a vertical plane XZ, each being articulated, on the one hand, by a first end, to a part of the casing of the compressor 28, and, on the other hand, by a second end to the cradle 114.

Thus, the casing of the compressor 28, and more generally the engine 20, is kept forward by the four connecting rods 110a-b and 120a-b which are distributed in pairs between two attachments 102, 502 and 104 which are mounted on one another. This structure allows for a better distribution of the loads on the front engine attachment 100 since the loads are distributed over the four articulations of the connecting rods 110a-b and 120a-b on the engine 20 and no longer only over two.

To ensure a relatively flexible link between the first attachment 102 and the second attachment 104, the first cylindrical nose 112, 512 is fixed in the orifice 116 via a ball coupling.

Similarly, the second cylindrical nose 118 is fixed in the piercing 32 via a ball coupling.

To these ends, a first ball is fixed in the orifice 116 and a second ball is fixed in the piercing 32, and respectively receive the first cylindrical nose 112, 512 and the second cylindrical nose 118.

The first connecting rods 110a b are oriented from the rear where they are fixed to the fixture 108 to the front where they are fixed to the casing of the compressor 28.

The second connecting rods 120a b are here arranged in a plane at right angles to the longitudinal axis of the engine 20. Along the axis X, the second connecting rods 120a b are arranged between the articulations of the first connecting rods 110a b on the fixture 108 and the articulations of the first connecting rods 110a b on the casing of the compressor 28.

In order to ensure the isostatism of the cradle 114 relative to the engine 20, one of the second connecting rods 120a b is rotationally blocked on the side of the cradle 114.

Each articulation of the connecting rods 110a b and 120a b is produced by a yoke joint in which is placed a part of the casing of the compressor 28.

The base 106, 506 is fixed to the structure 22 by any appropriate means.

In the embodiment of FIG. 3, the fixing of the base 106 to the structure 22 is produced by fixing means 109 taking the form of a linked double hinge. This interface consists of two subassemblies 111a b. Each subassembly 111a b comprises first ribs 113 deriving from the base 106 and second ribs 115 deriving from the structure 22. The first 113 and second 115 ribs are fitted into one another and are kept secured together by connecting pins 117 passing through them. Such an assembly facilitates the mounting of the engine 20 on the structure 22. Such a linked double hinge blocks the rotations of the hinges.

In the embodiment of FIG. 5, the fixing of the base 506 to the structure 22 is produced by fixing means 508 taking the form of four holes 509 through which bolts are introduced to allow fixing to the structure 22 by tightening.

When the engine 20 comprises a front bearing and a central bearing, the articulations of the first connecting rods 110a b on the engine 20 are arranged in a plane YZ passing centric between the plane at right angles to the longitudinal axis of the engine 20 and passing through the second cylindrical nose 118 and the plane containing the second connecting rods 120a b, and the articulations of the second connecting robs 120a b on the engine 20 are arranged in a plane YZ passing through the central bearing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment for an engine of an aircraft, for fixing said engine to a structure of the aircraft, the front engine attachment comprising:
a first attachment comprising:
a base configured to be fixed to the structure;
a first fixture mounted articulated on the base;

two first connecting rods, each configured to be articulated, by a first end, to the engine, and, by a second end to the fixture; and
a first cylindrical nose mounted on the base, and
a second attachment comprising:
a cradle extending along a longitudinal axis of the engine and comprising:
an orifice into which the cylindrical nose is fitted;
a second cylindrical nose forward of the orifice and the first cylindrical nose along the longitudinal axis and configured to be threaded into a piercing of the engine; and
two second connecting rods aft of the orifice and the first cylindrical nose along the longitudinal axis, each configured to be articulated, by a first end, to the engine, and, by a second end to the cradle.

2. The front engine attachment as claimed in claim 1, wherein the first cylindrical nose is fixed in the orifice via a ball coupling.

3. The front engine attachment as claimed in claim 1, wherein the second connecting rods of the second attachment are arranged in a plane at right angles to a longitudinal axis of the engine.

4. An aircraft comprising a structure, an engine and a front engine attachment comprising:
a first attachment comprising:
a base configured to be fixed to the structure;
a first fixture mounted articulated on the base;
two first connecting rods, each configured to be articulated, by a first end, to the engine, and, by a second end to the fixture; and
a first cylindrical nose mounted on the base; and
a second attachment comprising:
a cradle comprising:
a generally horizontal segment;
an orifice into which the first cylindrical nose is fitted, the orifice defined in a plane transverse to the generally horizontal segment at a first end of the generally horizontal segment; and
a second cylindrical nose at a second end of the generally horizontal segment and configured to be threaded into a piercing of the engine;
a first and a second arm extending from the first end of the generally horizontal segment; and
two second connecting rods, each configured to be articulated, by a first end, to the engine, and, by a second end to the first and second arms of the cradle, respectively,
wherein the base is fixed to the structure by a fixing means and the engine is fixed to the two first connecting rods and the two second connecting rods.

5. The aircraft as claimed in claim 4, wherein the second connecting rods of the second attachment are arranged in a plane at right angles to a longitudinal axis of the engine.

6. The aircraft as claimed in claim 4, wherein the fixing means comprises a linked double hinge including two sub-assemblies, each comprising first ribs deriving from the base and second ribs deriving from the structure, wherein the first and second ribs are fitted into one another, and
wherein the first and second ribs are kept secured together by connecting pins passing through them.

\* \* \* \* \*